(12) United States Patent
LeFevre et al.

(10) Patent No.: US 11,934,712 B2
(45) Date of Patent: Mar. 19, 2024

(54) SYSTEM AND METHOD FOR AUTOMATICALLY DIAGNOSING MEDIA HANDLING DEFECTS IN A PRINTING DEVICE

(71) Applicant: Xerox Corporation, Norwalk, CT (US)

(72) Inventors: Jason LeFevre, Penfield, NY (US); Douglas K. Herrmann, Webster, NY (US); Chu-heng Liu, Penfield, NY (US); Seemit Praharaj, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/455,234

(22) Filed: Nov. 17, 2021

(65) Prior Publication Data

US 2023/0153040 A1    May 18, 2023

(51) Int. Cl.
| | |
|---|---|
| *G06F 11/00* | (2006.01) |
| *G06F 3/12* | (2006.01) |
| *G06T 7/00* | (2017.01) |

(52) U.S. Cl.
CPC ............ *G06F 3/121* (2013.01); *G06F 3/1207* (2013.01); *G06F 3/1234* (2013.01); *G06T 7/001* (2013.01); *G06T 2207/30144* (2013.01)

(58) Field of Classification Search
CPC ..... G06F 3/121; G06F 3/1234; G06T 7/0002; G06T 7/001

USPC ..................... 358/1.14; 399/18, 16; 271/3.15
See application file for complete search history.

(56) References Cited

U.S. PATENT DOCUMENTS

| | | | |
|---|---|---|---|
| 7,283,143 B2 | 10/2007 | Mizes et al. | |
| 7,797,133 B2 | 9/2010 | Floeder et al. | |
| 7,810,896 B2 | 10/2010 | Mizes et al. | |
| 8,355,639 B2 | 1/2013 | Paul et al. | |
| 8,553,289 B2 | 10/2013 | Ramesh et al. | |
| 8,721,033 B2 | 5/2014 | Mongeon et al. | |
| 8,929,758 B2 | 1/2015 | Ramesh et al. | |
| 9,274,874 B1* | 3/2016 | Charnness | H04L 41/06 |
| 2003/0234960 A1* | 12/2003 | Kaltenbach | G06K 5/02 |
| | | | 358/3.26 |
| 2005/0157327 A1* | 7/2005 | Shoji | G06F 11/0751 |
| | | | 358/1.14 |
| 2009/0079832 A1* | 3/2009 | Moore | G06T 7/0004 |
| | | | 348/160 |
| 2011/0109921 A1* | 5/2011 | Paul | G03G 15/5033 |
| | | | 358/1.9 |
| 2013/0079972 A1* | 3/2013 | Lake | G07C 5/0808 |
| | | | 701/31.6 |

* cited by examiner

*Primary Examiner* — Jamares Q Washington
(74) *Attorney, Agent, or Firm* — Simpson & Simpson, PLLC

(57) ABSTRACT

A method of automatically diagnosing media handling defects on sheets, the method including receiving a first image of a first sheet, determining that the first image includes a detected media handling defect, determining that the detected media handling defect matches one or more known media handling defects in a database, and displaying a rectifying action.

16 Claims, 7 Drawing Sheets

SYSTEM AND METHOD FOR AUTOMATICALLY DIAGNOSING MEDIA HANDLING DEFECTS IN A PRINTING DEVICE

FIELD

The present disclosure relates to printing devices, and more particularly, to correcting media handling defects in printing devices, and even more particularly, to a system and method for automatically diagnosing media handling defects in printing devices.

BACKGROUND

In printing systems, for example production printing systems, media handling defects can result from malfunctions or contamination of paper-transport rolling elements, stationary elements in the paper path, or other paper path elements. These rolling or stationary elements can result in media handling defects on a blank sheet or a printed sheet in the form of smudges and smears, creases, dents, bent corners or dog ears, gloss defects, drag-out (i.e., undried ink dragged out backwards along the sheet), scuffs, marks, etc. These media handling defects are different from print or print image defects, which are defects related to the incorrect application of marking material, for example, liquid ink or solid toner, onto the sheet (i.e., the means of intentionally placing marks on the sheet). Thus, print image defects relate only to incorrect placement of marking material on a sheet by the print head (i.e., an image must be placed on the sheet) whereas media handling defects relate to defects caused, not from the printing process, but the media handling process (i.e., an image does not need to be printed on the sheet, but can). When these media handling defects occur on a sheet, a service technician is called onsite to diagnose and fix the problem. The cost for a printing system supplier to send a technician onsite is usually regarded as a last resort since it is by far the most expensive option when compared to other remote corrective approaches.

Therefore, there is a long felt need for a system and method that has the ability to perform this type of fault recovery, namely, to diagnose and correct the media handling defects, without the need to bring a technician on-site, and is as minimally invasive and visible to the customer as possible.

SUMMARY

According to aspects illustrated herein, there is provided a method of automatically diagnosing media handling defects on sheets, the method comprising receiving a first image of a first sheet, determining that the first image includes a detected media handling defect, determining that the detected media handling defect matches one or more known media handling defects in a database, and displaying a rectifying action.

In some embodiments, the method further comprises after the step of displaying a rectifying action, receiving an indication that the rectifying action has fixed the detected media handling defect, and updating the database. In some embodiments, the step of receiving the indication that the rectifying action has fixed the detected media handling defect comprises receiving an input from a user. In some embodiments, the step of receiving the indication that the rectifying action has fixed the detected media handling defect comprises receiving a second image of a second printed sheet, and determining that the second image does not include the detected media handling defect. In some embodiments, the method further comprises determining that the detected media handling defect does not match the one or more known media handling defects in the database, and displaying an alert. In some embodiments, the first image is received from an inline imaging module of a printing device. In some embodiments, the step of determining that the detected media handling defect matches one or more known media handling defects in the database comprises comparing detected media handling defect signatures to known media handling defect signatures. In some embodiments, the step of comparing the detected media handling defect signatures to the known media handling defect signatures comprises comparing the detected media handling defect signatures to elements of one or more component maps. In some embodiments, the method further comprises determining that the detected media handling defect does not match the one or more known media handling defects in the database, receiving an input corresponding to a solution to the detected media handling defect, and updating the database. In some embodiments, the method further comprises, after the step of displaying a rectifying action, receiving an indication that the rectifying action has not fixed the detected media handling defect, and updating the database. In some embodiments, the first sheet and/or the second sheet comprises a printed image thereon.

According to aspects illustrated herein, there is provided a system for automatically diagnosing media handling defects on sheets, the system comprising one or more computer processors, one or more computer readable storage media, a printing device including an image capturing device, and program instructions stored on the one or more computer readable storage media for execution by at least one of the one or more computer processors, the program instructions comprising program instructions to receive a first image of a first sheet from the image capturing device, program instructions to determine that the first image includes a detected media handling defect, program instructions to determine that the detected media handling defect matches one or more known media handling defects in a database, and program instructions to display a rectifying action.

In some embodiments, the program instructions further comprise program instructions to receiving an indication that the rectifying action has fixed the detected media handling defect, and program instructions to update the database. In some embodiments, the program instructions to receive the indication that the rectifying action has fixed the detected media handling defect comprise program instructions to receive an input from a user. In some embodiments, the program instructions to receive the indication that the rectifying action has fixed the detected media handling defect comprise program instructions to receive a second image of a second sheet, and program instructions to determine that the second image does not include the detected media handling defect. In some embodiments, the program instructions further comprise program instructions to determine that the detected media handling defect does not match the one or more known media handling defects in the database, and program instructions to display an alert. In some embodiments, the image capturing device is an inline imaging module arranged proximate a loop of the printing device. In some embodiments, the program instructions to determine that the detected media handling defect matches one or more known media handling defects in the database comprise program instructions to compare detected media handling defect signatures to known media handling defect signatures. In some embodiments, the program instructions to compare the detected media handling defect signatures to the known media handling defect signatures comprise program instructions to compare the detected media handling defect signatures to elements of one or more component maps. In some embodiments, the program instructions further comprise program instructions to determine that the detected media handling defect does not match the one or more known media handling defects in the database, program instructions to receive an input corresponding to a solution to the detected media handling defect, and program instructions to update the database. In some embodiments, the program instructions further comprise program instructions to receive an indication that the rectifying action has not fixed the detected media handling defect, and program instructions to update the database. In some embodiments, the first sheet and/or the second sheet comprises a printed image thereon.

According to aspects illustrated herein, there is provided a system and method that can identify the source of paper path media handling defects, reducing the number of service interactions with customers across a broad base of printing devices (e.g., production printing systems). In some embodiments, the system and method is integrated directly into the printing devices on a storage media (e.g., program instructions on a computer readable storage media). The system and method utilizes an image capturing device such as a camera, imaging array, scanner (e.g., an inline imagine module (IIM)), to capture a picture/image of a sheet (i.e., a blank sheet or a printed sheet) anytime they pass underneath the sensor. In some embodiments, an IIM is used wherein the IIM comprises a scan bar or linear array that spans the entire cross process direction at 300 dots per inch (dpi). The use of a IIM provides a high definition image of a sheet moving in the process direction thereunder. Images captured by the IIM are then manipulated and interpreted in a way that can generate data related to media handling defects on that sheet to be used by the system for enabling corrective action on any number of printing systems. In some embodiments, images may be printed on the sheet to more clearly highlight the media handling defects. For example, an image on a sheet may more clearly illustrate a smudge created by a baffle. The image may be a special diagnostic image or an image of a print job. In some embodiments, the IIM will take pictures of the printed sheets to help diagnose and suggest corrective actions for paper path elements (e.g., rollers, ink on a roller, decurlers, vacuum transport belts, cooler module, dryer module, baffles, stacker, etc.) that may be causing a media handling defect, rather than print head issues.

The system and method utilizes a library of known media handling defects that have been pre-programmed during development of that printing device and/or added to the library as a result of a media handling defect occurring subsequent to development (i.e., a media handling defect that was not previously known but encountered during use of the printing device). When the system matches the signature of a media handling defect to a signature of a media handling defect in library, it sends a service tip to the user to check a particular area of the printing device (e.g., an inbound idler roller, an outbound drive roller, etc.). In some embodiments, the signature of the media handling defect is associated with its position on the sheet as well and/or the periodicity of the media handling defect on the sheet, which would correspond to the diameter of a rolling element. For example, ink or a dent on a small diameter roller might cause a media handling defect on a sheet or printed sheet twelve times whereas ink or a dent on a large diameter roller might cause a media handling defect on a sheet or printed sheet only there times. This helps to identify which roller is causing the media handling defect. If the system correctly identifies the media handling defect, it will then merge the signature of this media handling defect with other signatures of similar media handling defects to strengthen the database. Thus, the system is constantly updating the library with new media handling defects and media handling defect variations. In some embodiments, if the system does not find a match for the signature of the media handling defect, it sends a message to the user indicating that such media handling defect signature does not match or correspond to any known media handling defect signatures. The system may then log the new media handling defect and request follow up information on the solution to fixing that new media handling defect.

According to aspects illustrated herein, there is provided a system and method that identifies the source of paper path media handling defects and reduces the number of service interactions with customers across a broad base of printing devices. The system utilizes a camera or a camera array, such as an IIM, to capture an image or images of a sheet as it passes thereby on the print path. The image (or images) is then used to diagnose media handling defects that occur during the course of printing device operation.

In some embodiments, the captured image is analyzed for media handling defects and the media handling defects are compared to a chart, for example, a component map for that printing device. In some embodiments, the component map may be a roller component map, which shows the inboard-to-outboard location of all of the relevant rollers in a printing device compared to some datum, typically the registered edge of a sheet. Outboard refers to, in the cross process direction, the side of the printing device closest to the user and inboard refers to the side of the printing device furthest from the user. In some embodiments, the component map may detail the exact positions and widths of all the rollers, as well as positions of other parts of the paper path, such as baffle ribs, decurlers, baffle vent slots, stacker, dryer, and any other features which contact the media and can potentially result in media handling defects.

According to aspects illustrated herein there is provided a system and method that captures, using a camera or scanner, an image of a sheet, evaluates the image for media handling defects, compares the media handling defects to a library of known media handling defects for that printing device to determine a cause of that media handling defect based on media handling defect signatures, and based on the cause send a service tip to the user to check a particular area of the printing device. The media handling defect can be associated with the position on the sheet but also the periodicity of the media handling defect which would correspond to the diameter of a rolling element. Thus, the image that is captured by the camera is used to match to the printing device structure (e.g., the rolling element) in the paper path causing the issue.

According to aspects illustrated herein, there is provided a method for automatically diagnosing media handling defects in a printing device, the method comprising using the normal "run-time" sheet, at the customer defined cadence, after the IIM has scanned the sheet, sending the sheet back through the duplex path. The run-time sheet will pass through the dryers (and in some embodiments the cooler) and then back to the IIM, now on the back side (i.e., side two). The IIM will scan the sheet and compare the image to an internal database of scans of known media handling defects. If a media handling defect is found in the scanned sheet that corresponds to previously matched media handling defects, the output will be a message to the user to check a specific roller. After the user has acknowledged that the issue has been addressed, another sheet is sent through the system to validate that the issue has been resolved. The method will then determine if a subsequent sheet shows that the media handling defect has been corrected.

According to aspects illustrated herein, there is provided a system and method which can identify the source of paper path induced media handling media handling defects, by use of an internal scanner, to analyze test patterns for signature media handling media handling defects related to specific paper path elements. A library of signature media handling defects is arranged internal to the printing device (or on a network) and is matched to the detected media handling defect. Upon detection of a media handling defect, the printing device will generate a message to have the operator check a certain area of the machine for corrective action. Some benefits of the present disclosure include the ability to identify paper path induced media handling defects, compare them to a library, and then give corrective action to the operator for the purposes of reducing onsite technician calls and increasing printing device uptime.

According to aspects illustrated herein, there is provided a system and method for applying an analysis to sheet images acquired during the printing process to detect the presence and determine the source of paper-path related print media handling defects. Benefits of the present disclosure include the ability to reduce the need for customer service visits to resolve paper-path-related print quality issues, thereby increasing customer up-time and reducing service costs for the printing device manufacturer. In addition, the present disclosure could be extended to include learning from history, for example, machine learning (ML) techniques, to improve analysis.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
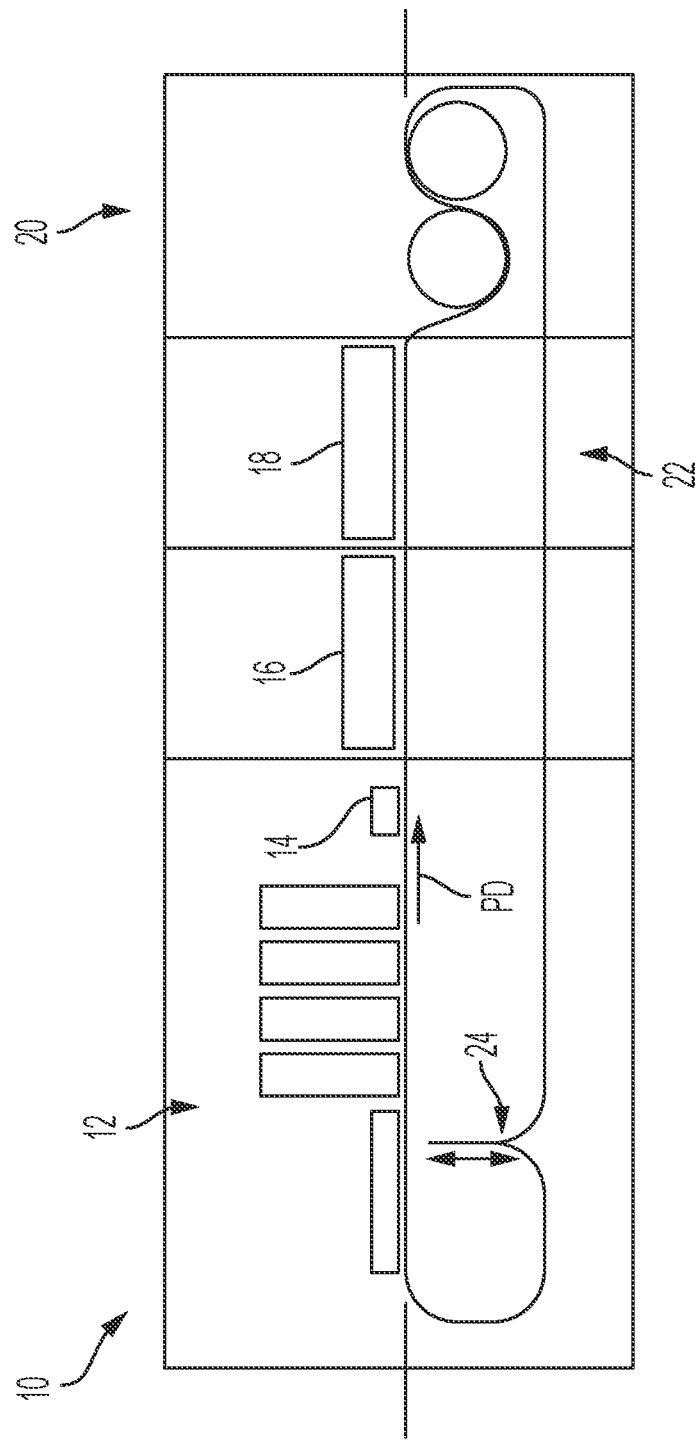
FIG. 1 is a simplified elevational view showing the relevant parts of a printing device in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

As used herein, "fusing," with respect to dry marking material such as toner, is intended to mean supplying heat energy and/or pressure, having the effect of slightly liquifying the applied dry marking material (toner) particles, in turn causing them to adhere to a surface. "Drying," as used herein, is intended to mean applying energy, typically but not necessarily heat in radiant and/or convective form, having the effect of causing a liquid component of the ink (a liquid marking material) to evaporate. "Curing," as used herein, for example with respect to IR inks (liquid marking material) is intended to mean applying energy, such as by typically but not necessarily infrared waves, having the effect of causing a chemical reaction within at least one component of the applied ink, thereby fixing the ink to a surface.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose.

As used herein, "sheet," "web," "substrate," "printable substrate," and "media" refer to, for example, paper, transparencies, parchment, film, fabric, plastic, photo-finishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

As used herein, "process direction" is intended to mean the direction of media transport through a printer, while "cross process direction" is intended to mean the perpendicular to the direction of media transport through a printer.

As used herein, "media handling defects" are intended to mean defects on a sheet resulting from elements of the media handling process, such as baffle ribs, decurlers, baffle vent slots, stacker, dryer, and any other features which contact the media. Media handling defects do not include print image defects which are related to the intentional application of marking material on a sheet.

As used herein, "defect signatures" are characteristics of the defect, for example, the geometric location of the defect, dimensions (e.g., width, length, diameter, circumference, geometric shape, etc.) of the defect, periodicity of the defect, etc. The detected media handling defect signatures are compared to known media handling defect signatures in order to identify the cause of the defect.

As used herein, a "rectifying action" or a "solution" is an action that, when carried out, is intended to prevent the defect from occurring again or solves the problem (i.e., a fix for the defect). An example of a rectifying action is cleaning a specific roller.

These rolling or stationary elements can result in media handling defects on a blank sheet or a printed sheet in the form of smudges and smears, creases, dents, bent corners or dog ears, gloss defects, drag-out (i.e., undried ink dragged out backwards along the sheet), scuffs, marks, etc. These media handling defects are different from print or print image defects, which are defects related to the incorrect application of marking material, for example, liquid ink or solid toner, onto the sheet (i.e., the means of intentionally placing marks on the sheet). Thus, print image defects relate only to incorrect placement of marking material on a sheet by the print head (i.e., an image must be placed on the sheet) whereas media handling defects relate to defects caused, not from the printing process, but the media handling process (i.e., an image does not need to be printed on the sheet, but can).

Referring now to the figures, FIG. 1 is a simplified elevational view showing the relevant parts of printing device 10, in accordance with some embodiments of the present disclosure. Printing device 10 generally comprises one or more print heads or markers 12, image capturing device 14, one or more dryers, for example, dryer 16 and/or dryer 18, simplex or duplex loop 22, and one or more inverters, for example, inverter 24. In some embodiments, printing device 10 further comprises cooler 20. Printing device 10 may communicate with a central controller to implement the printing path schedule created by a scheduler program. Printing device 10 is capable of simplex or duplex output, in which a stream of images (or digital video signals representative of images) desired to be printed causes the desired images to be formed on a selected side of a print sheet or substrate, via print head 12. The particular embodiment shown in FIG. 1 illustrates an ink-jet printer; however, it should be appreciated that the present disclosure could be implemented on other types of image-creation technologies, such as electrostatographic or xerographic printers (i.e., using toner).

In some embodiments, a feeder module is operatively arranged to feed sheets on which to print images from a feeder tray to loop 22. Printing device 10 may comprise a plurality of feeder trays wherein the sheets in the feeder trays may differ in attributes, for example, size, color, stock weight, coating, grain direction, or the presence of a pre-printed letterhead. When it is desired to create an image on a sheet, a sheet of a desired type is drawn from a feeder tray, and the individual sheet is fed onto loop 22. It should be appreciated that printing device 10 may comprise any number of feeders and feeder trays.

Loop 22 generally comprises an endless belt which is capable, by means of friction, static electricity, vacuum, or other means, of retaining a plurality of sheets thereon, thereby retaining a particular sheet until it is time for the sheet to receive an image on the side of the sheet facing outwardly from the belt of loop 22. In the embodiment shown in FIG. 1, it is intended that sheets "ride" on the outer surface of the belt of loop 22. Along one portion of loop 22, the belt of loop 22 comes into close contact with print head 12, which may transfer an image onto the side of the sheet facing outwardly from the belt of loop 22. In some embodiments, print head 12 comprises one or more ink jet print heads. In some embodiments, print head 12 comprises a photoreceptor belt, a transfer corotron, and an imager in accordance for use with toner (i.e., xerography). Marker 12 transfers the image onto a side of a sheet. In some embodiments, the sheet then passes through dryer 16 such that drying of the liquid ink occurs. In some embodiments, after passing through dryer 16, the sheet is then sent through an additional dryer 18 such that drying of the liquid ink occurs. In some embodiments, after passing through dryer 18, the sheet is sent through cooler 20 such that the heat inputted into the sheet in dryer 16 and/or dryer 18 is removed therefrom. It should be appreciated that in some embodiments, wherein dry marking material is used, one or more fusers would be used in lieu of dryers 16 and 18 and cooler 20. Furthermore, infrared waves may be used to cure infrared inks in lieu of or in addition to dryers 16 and 18. If at this point the sheet having the image thereon is desired to be output from the system, a device such as a gate will cause the sheet to be disengaged from loop 22 and output from the cooler module.

To create a duplex print, that is, a print having one desired image on one side thereof and another desired image on the other side thereof, it is necessary to make the other side of the sheet available to print head 12, by causing the other side of the sheet to face outward while the sheet rides on the outside of loop 22. For this purpose, printing device 10 comprises inverter 24 operatively arranged along loop 22. Inverter 24 is operatively arranged to remove a sheet from loop 22 which comprises an image already arranged on the outward-facing side thereof, and turn the sheet over so that the other, "non-printed" side of the sheet faces outward from the belt of loop 22. Thus, inverter 24 removes the sheet from loop 22, feeding it in one direction, and then delivering the sheet back to loop 22 (as shown by the double-headed arrow next to inverter 24) to turn the sheet over (i.e., invert the sheet 180°). Loop 22 then re-feeds the sheet for another cycle so that print head 12 can place another desired image on the other side thereof. A gate may be arranged next to inverter 24 to selectably cause the sheet to enter inverter 24, depending on whether the particular sheet passing thereby is a simplex print, the first side of a duplex print, or a second side of a duplex print. As shown in FIG. 1, after a front side f image is placed on a sheet at print head 12, this sheet travels around loop 22, is picked off loop 22 by the gate, inverted by inverter 24, and placed back on loop 22, where the inverted sheet will again become available to receive an image from print head 12 at a time in the future after the inverted sheet makes its way around loop 22.

Printing device 10 further comprises image capturing device 14. Image capturing device 14 may comprise any device suitable for capturing an image of a sheet passing thereby, for example, a camera, imaging array, scanner (e.g., an inline imaging module (IIM)), etc. In some embodiments, an IIM is used wherein the IIM comprises a scan bar or linear array that spans the entire cross process direction CPD at 300 dots per inch (dpi). The use of a IIM provides a high definition image of a sheet moving in the process direction PD thereunder. Images captured by the IIM are then manipulated and interpreted by automatic media handling defect diagnostic program 140 as will be described in greater detail below. It should be appreciated that the images formed on the sheet may be the images of the print job or diagnostic images that are printed solely for the purposes of showing media handling defects very clearly. In some embodiments, there may be no images formed on the sheet.

In some embodiments, printing device 10 further comprises a decurling module or one or more decurlers. In some embodiments, printing device 10 further comprises an output module including a stacker. In some embodiments, printing device 10 comprises one or more printing path elements, for example, inter alia, feeders, paper path transports, print heads, sensors, dryers, fusers, curers, rollers, ribs, belts, screws, baffles, bearings, dryer bridges, belt holes, fingers, vents, decurlers, stackers, inverters, and gates.

Figure 2:
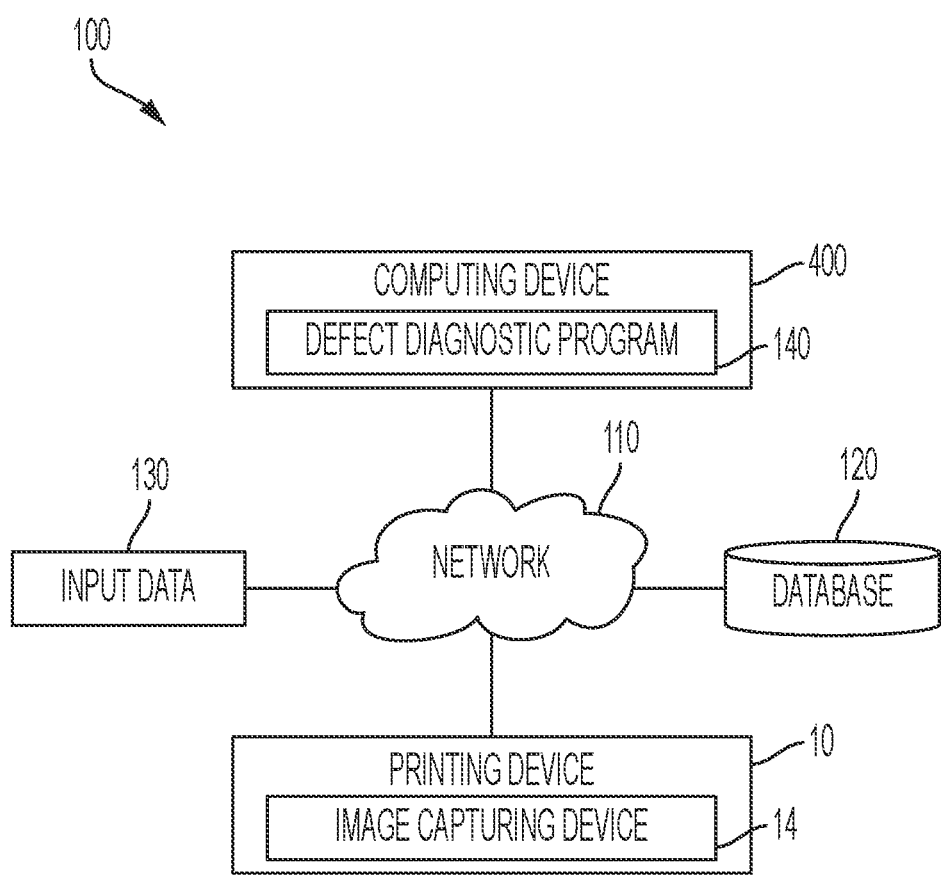
FIG. 2 is a functional block diagram illustrating an environment, in accordance with some embodiments of the present disclosure.

FIG. 2 is a functional block diagram illustrating an automatic media handling defect diagnostic environment, generally environment 100, in accordance with some embodiments of the present disclosure. FIG. 2 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, environment 100 includes computing device 400, database 120, user input data 130, printing device 10, and image capturing device 14 all of which are connected to network 110.

Network 110 can be, for example, a local area network (LAN), a wide area network (WAN) such as the Internet, or a combination of the two, and can include wired, wireless, or fiber optic connections.

Computing device 400 may be a hardware device that detects media handling defects on a sheet from an image captured by image capturing device 14, compares the detected media handling defects to a library of known media handling defects, for example stored in database 120, and proposes a solution to fix the cause of the detected media handling defect using automatic media handling defect diagnostic program 140. Computing device 400 is capable of communicating with network 110, database 120, input data 130, printing device 10, and image capturing device 14. In some embodiments, computing device 400 may include a computer. In some embodiments, computing device 400 may include internal and external hardware components, as depicted and described in further detail with respect to FIG. 7. In some embodiments, media handling defect diagnostic program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 7.

Media handling defect diagnostic program 140 receives one or more images of a sheet from image capturing device 14. The sheet may be blank or may comprise one or more printed image thereon, for example, images of the ordered print job (e.g., text, magazine pages, flyers, etc.) or diagnostic images (i.e., images printed on a sheet to specifically accentuate media handling defects in printing device 10). Media handling defect diagnostic program 140 then analyzes the image of the sheet to detect if any media handling defects are present. If media handling defects are present, media handling defect diagnostic program 140 compares those media handling defects to known media handling defects stored in database 120. In some embodiments, the detected media handling defects are compared to one or more component maps, for example component map 200 or component map 250. If a known media handling defect is found that matches the detected media handling defect, media handling defect diagnostic program 140 proposes a solution to fix the cause of the detected (and known) media handling defect (e.g., clean roller C, tighten the mounting screw for the inbound feeder roller, etc.). Media handling defect diagnostic program 140 then receives an input from the operator that indicates whether the media handling defect has been fixed, and may store data related to the input and/or the detected media handling defect in the library.

Database 120 is a central storage for known media handling defects as well as the causes of known media handling defects. Specifically, media handling defect diagnostic program 140 is aimed at fixing media handling defects caused by printing path elements, for example, inter alia, feeders, paper path transports, print heads, sensors, dryers, fusers, curers, rollers, ribs, belts, screws, baffles, bearings, dryer bridges, belt holes, fingers, vents, decurlers, stackers, inverters, and gates. Media handling defects created by printing path elements comprise, inter alia, smudges and smears, creases, dents, bent corners, gloss defects, and drag-out. This is not the same as printed image defects caused by incorrect application of marking material on a sheet by a print head, as previously described). Database 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, database 120 resides in/on printing device 10. In some embodiments, database 120 resides at a remote location from printing device 10, and is accessible over network 110. For example, database 120 may reside at a location of or controlled by the vendor or fleet manager of printing device 10. It should be appreciated that database 120 may be accessible by a plurality of printing devices (i.e., printing devices of the same model that would exhibit the same media handling defects and/or printing devices of different model that are known to exhibit the same or similar media handling defects), wherein the constant feedback from those printing devise and media handling defect diagnostic program 140 arranged thereon would provide a very accurate and ever-growing library of known media handling defects, their causes, and rectifying actions/solutions.

Figure 3:
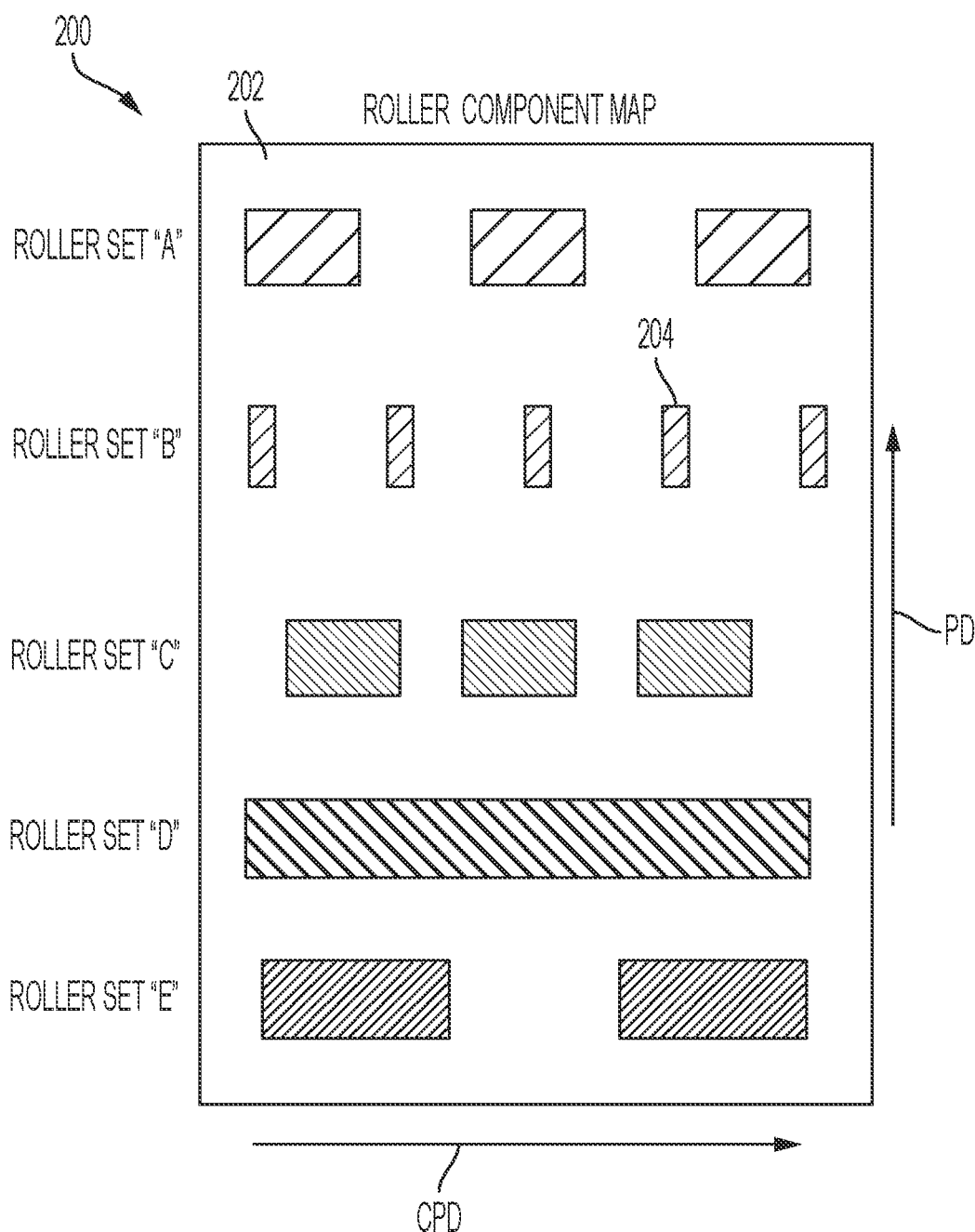
FIG. 3 is an elevational view of a component map.

FIG. 3 is an elevational view of component map 200. As an example, component map 200 is an example of known media handling defect data that may be stored in database 120. Component map 200 illustrates known roller defects, their locations and dimensions on a sheet, for example sheet 202. As shown, roller set "A" comprises three rollers that engage sheet 202 at the cross process direction CPD locations shown. Roller set "B" comprises five rollers that engage sheet 202 at the cross process direction CPD locations shown. Roller set "C" comprises three rollers that engage sheet 202 at the cross process direction CPD locations shown. Roller set "D" comprises one roller that engages sheet 202 at the cross process direction CPD location shown. Roller set "E" comprises two rollers that engage sheet 202 at the cross process direction CPD locations shown. If media handling defect diagnostic program 140 detects a media handling defect that occurs only in the cross process direction CPD location of the fourth roller of roller set "B", namely, roller 204, media handling defect diagnostic program 140 will indicate that the issue resides in roller 204 and propose a solution that is known to fix the issue. Media handling defect diagnostic program 140 may also consider the width of the detected media handling defect when comparing to known media handling defect. For example, the width of the detected media handling defect can be matched to the width of a known media handling defect for the purposes of isolating a roller that causes the known media handling defect. Media handling defect diagnostic program 140 may also consider the periodicity of the media handling defect, namely, how often the media handling defect occurs on the sheet in the process direction. For example, if there is ink on an idler roller, the ink spot may touch the sheet a certain number of times as the sheet passes thereover. As such, ink on a small diameter roller might cause a media handling defect on a printed sheet twelve times whereas ink on a large diameter roller might cause a media handling defect on a printed sheet only there times. This helps to identify which roller is causing the media handling defect.

Figure 4:
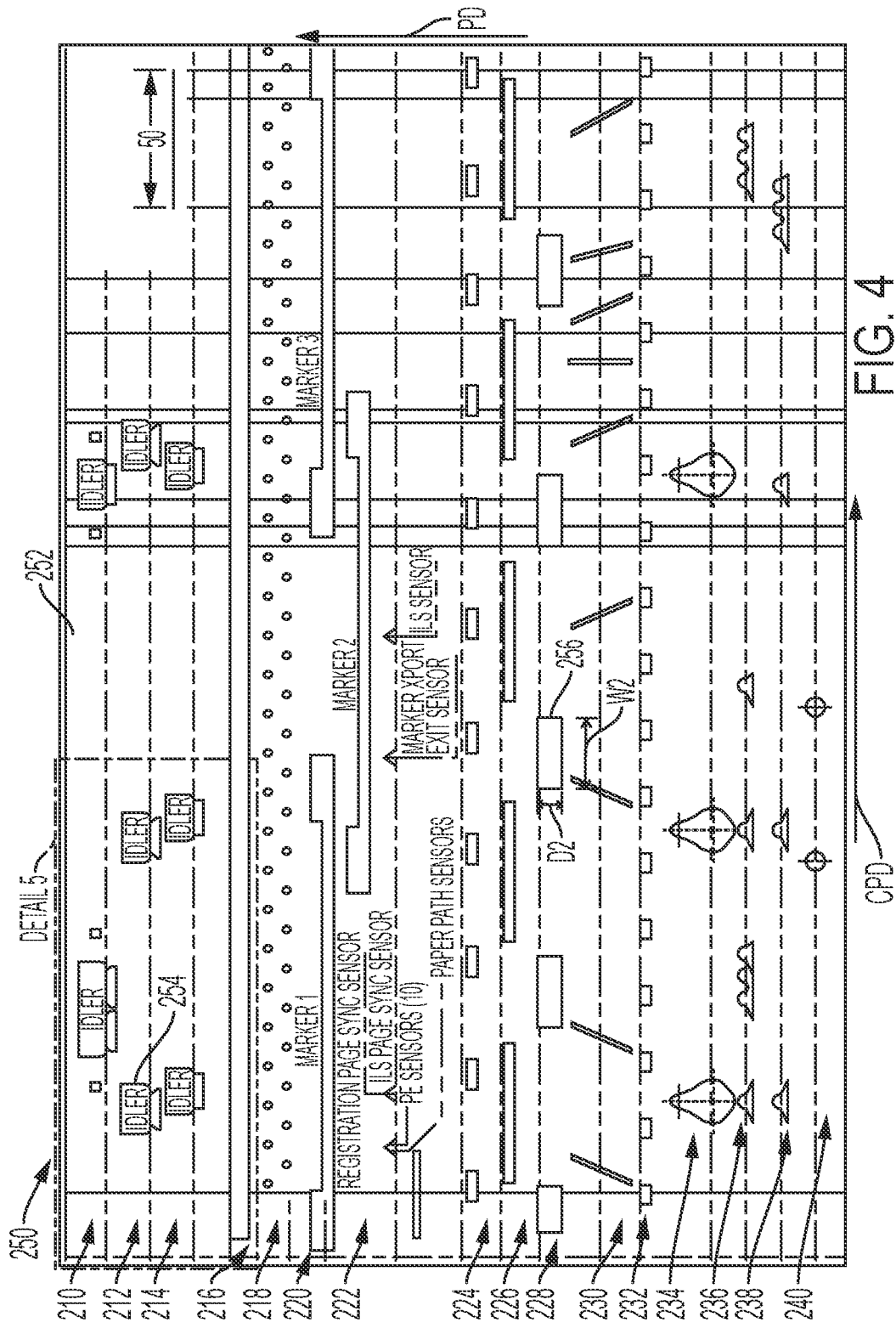
FIG. 4 is an elevational view of a component map.
Figure 5:
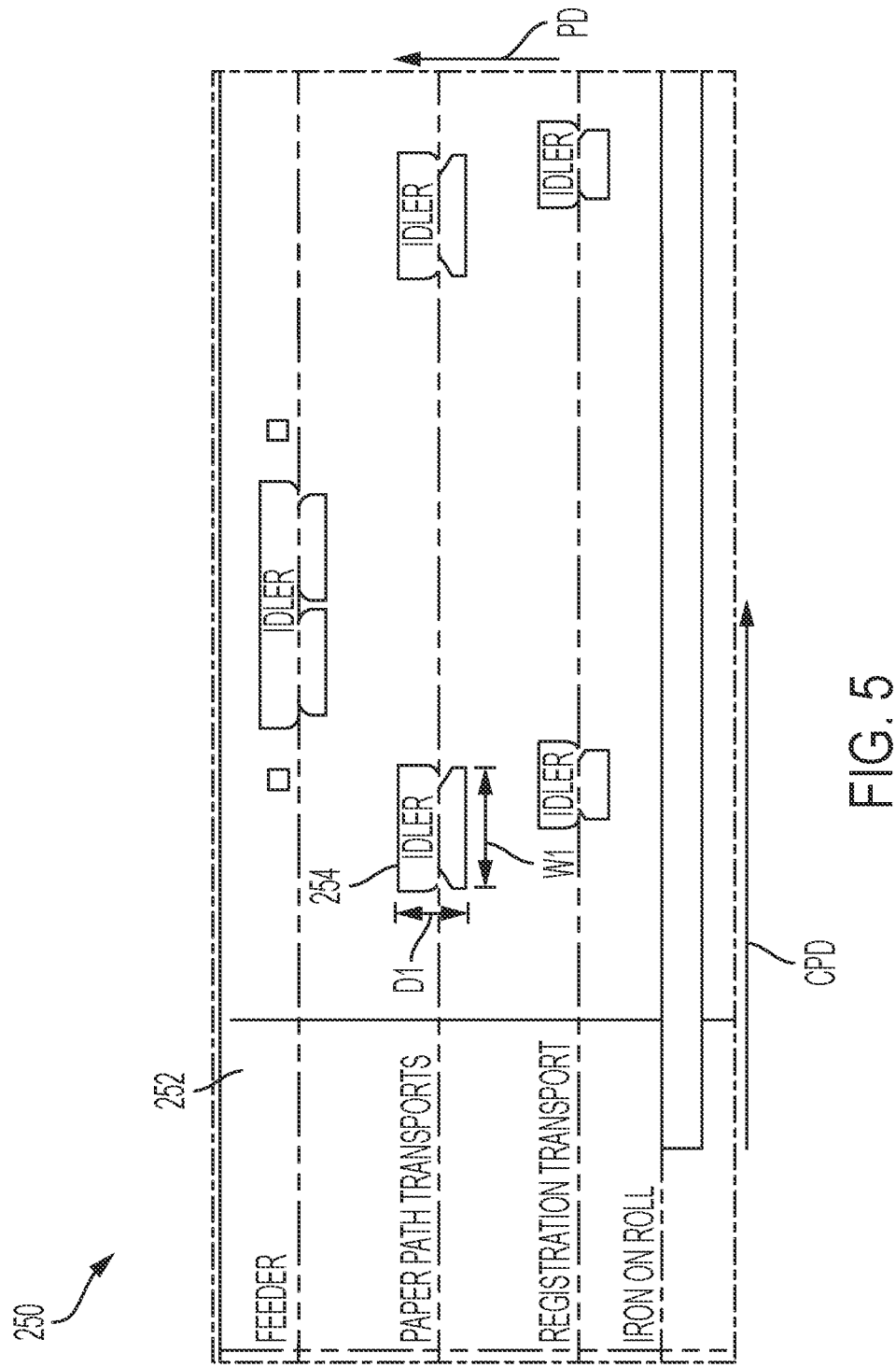
FIG. 5 is an enlarged view of the component map taken generally along detail 5 in FIG. 4.

FIG. 4 is an elevational view of component map 250. FIG. 5 is an enlarged view of component map 250 taken generally along detail 5 in FIG. 4. Component map 250 is an example of known media handling defect data that may be stored in database 120. Component map 250 illustrates known media handling defects, not just of rollers, but of other componentry in printing device 10. Specifically, component map 250 illustrates the cross process direction CPD location of feeder idler rollers 210, paper path transport idler rollers 212, registration transport idler rollers 214, iron on roll 216 (the roller that forms the transition between the feeder and the printing module), marker transport belt hole pattern 218, print heads 220 (e.g., print heads or markers 1, 2, and 3), sensors or sensor locations 222, dryer entrance fingers 224, dryer belts 226, dryer bridge ramps 228, dryer exit ribs 230, decurler backup bearings 232, dryer vacuum (VCT) transport (XPORT) vents 234, duplex transport (XPORT) upper baffle vent slots 236, duplex transport (XPORT) lower baffle vent slots 238, and stacker idler mounting screws 240 on sheet 252. For example, component map 250 illustrates the cross process direction CPD location, width W1, and diameter D2 of idler roller 254. The cross process direction CPD location and dimensions of the print path elements (width, length, diameter, circumference, geometric shape, etc.) are known as signatures. Detected media handling defects that exhibit these signatures are matched with the signatures of known media handling defects in the library, along with their root causes (e.g., a stuck drive roller, a loose stacker idler mounting screw, a misaligned dryer belt, etc.), and their rectification. In another example, media handling defect diagnostic program 140 may detect a media handling defect on a sheet that occurs at the cross process direction CPD location 256, and that has width W2 and length or a processes direction PD dimension D2. This would indicate that the media handling defect is caused by the third dryer bridge ramp, and a solution to fix the problem would be proposed to the operator.

Input data 130 is data inputted by an operator. For example, after a media handling defect rectifying action is proposed, the operator may input data indicating whether the media handling defect no longer occurs (or still occurs). Input data 130 may also include data inputted by an operator related to signatures of a media handling defect. For example, while media handling defect diagnostic program 140 is arranged to detect such data automatically via image capturing device 14, alternatively or additionally the operator may input the cross process direction CPD location, the periodicity, and the one or more dimensions of a media handling defect. Media handling defect diagnostic program 140 may utilize input data 130 in real time to formulate rectifying actions and/or store such input data 130 in database 120 for future use. The system, namely, environment 100, is responsive to input data 130 provided by an operator or read from database 120.

Figure 6:
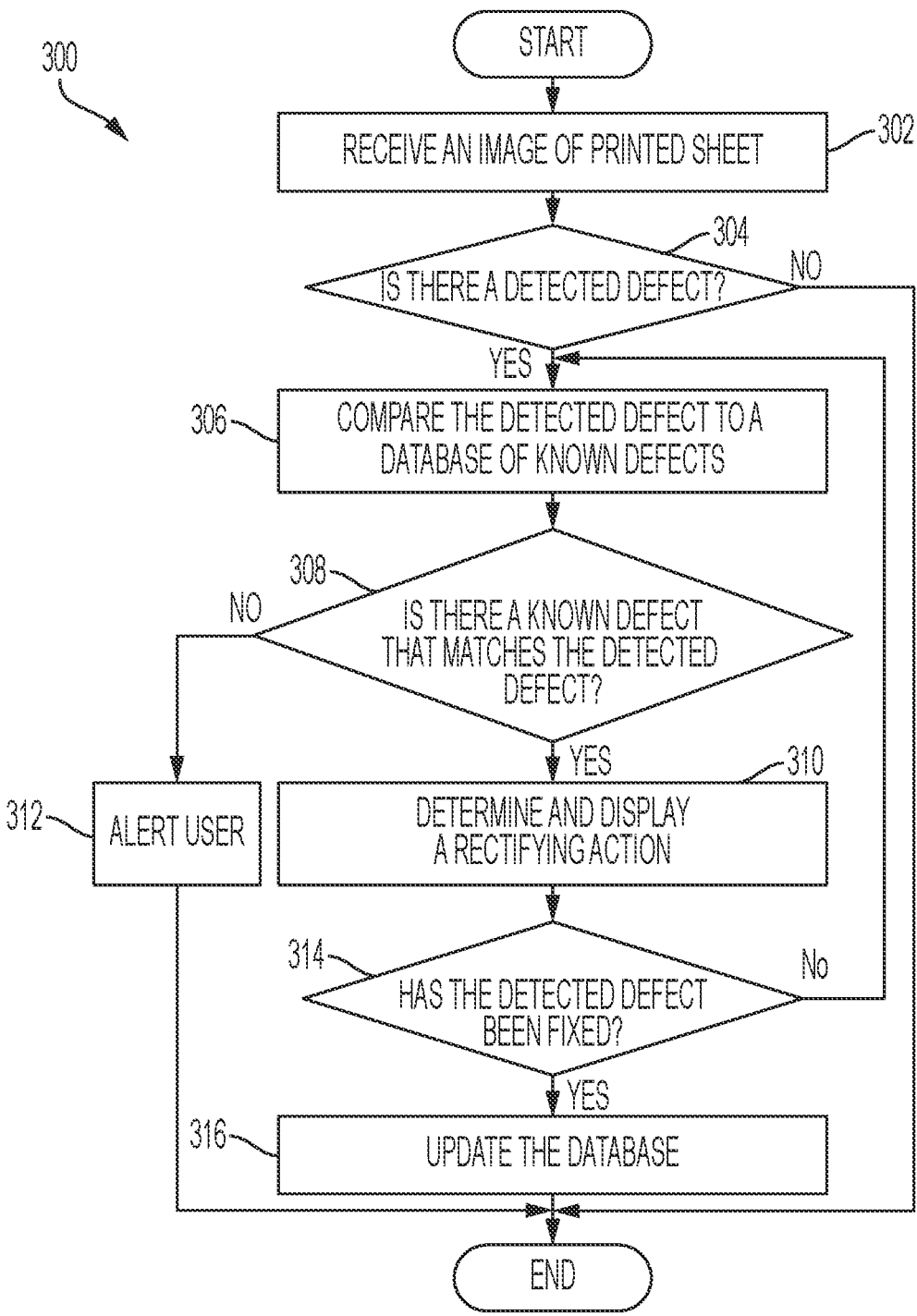
FIG. 6 is a flow chart depicting operational steps for automatically diagnosing media handling defects in a printing device; and, FIG. 7 is a block diagram of internal and external components of a computer system, in accordance with some embodiments of the present disclosure.

FIG. 6 shows flow chart 300 depicting operational steps for automatically diagnosing media handling defects in a printing device.

In step 302, media handling defect diagnostic program 140 receives an image of a sheet. As previously described, in some embodiments, the image of the sheet is captured by image capturing device 14. In some embodiments, image capturing device 14 is arranged within printing device 10 and captures the image of the sheet as the sheet is passing thereby on loop 22. In some embodiments, the sheet comprises an image printed thereon. In some embodiments, the sheet does not comprise any image printed thereon.

In step 304, media handling media handling defect diagnostic program 140 determines, from the image, if there is a detected media handling defect on the sheet. Specifically, media handling defect diagnostic program 140 determines if there are any detected media handling defects on the sheet formed by printing path element, which include, inter alia, smudges and smears, creases, dents, bent corners, gloss defects, and drag-out.

If, in step 304, media handling defect diagnostic program 140 determines that there are no detected media handling defects (i.e., media handling defect diagnostic program 140 does not detect any media handling defects in the image of the sheet), then the program ends.

If, in step 304, media handling defect diagnostic program 140 determines that there is a detected media handling defect (e.g., media handling defect diagnostic program 140 finds a smudge in the printed ink), then in step 306 media handling defect diagnostic program 140 compares the detected media handling defect to a database of known media handling defects. As previously described, media handling defect diagnostic program 140 may compare the cross process direction CPD location, dimensions, and/or periodicity of the detected media handling defect (i.e., the signatures of the media handling defect) to the cross process direction CPD location, dimensions, and/or periodicity of known media handling defects stored in database 120. For example, media handling defect diagnostic program 140 compares the cross process direction CPD location, dimensions, and/or periodicity of the detected media handling defect to one or more component maps (e.g., component maps 200 and 250).

In step 308, media handling defect diagnostic program 140 determines if there is a known media handling defect that matches the detected media handling defect. For example, using the signatures of the detected media handling defect, media handling defect diagnostic program 140 reviews the one or more component maps for a known media handling defect having the same or similar signatures as the detected media handling defect. This might include a match in at least one of the cross process direction CPD location, width, diameter, process direction dimension, circumference, geometry, and periodicity.

If, in step 308, media handling defect diagnostic program 140 determines that there is no known media handling defect that matches the detected media handling defect, then in step 312 media handling defect diagnostic program 140 alerts the user or operator of the same. In some embodiments, the alert is a message to the user that there are no known media handling defects that match the detected media handling defect.

In some embodiments, in an additional step after step 312, media handling defect diagnostic program 140 will save the signatures of the detected media handling defect in database 120 as well as the failure to find any matching known media handling defects. As such, the next time such media handling defect occurs, media handling defect diagnostic program 140 be able to find a matching known media handling defect in database 120 and, although a solution may not be known, a pattern of that new media handling defect reoccurring can be established. In a further step, media handling defect diagnostic program 140 may receive an input via input data 130 of the rectifying action to fix the new media handling defect (e.g., tighten the fourth dryer belt on its rollers) and store the same in database 120 in association with the new media handling defect. As such, the library of known media handling defects and solutions thereto is constantly being updated with new media handling defects and their solutions. In some embodiments, such input data may also come from one or more other printing devices (of the same or different make and model) over a network.

If, in step 308, media handling defect diagnostic program 140 determines that there is a known media handling defect that matches the detected media handling defect, then in step 310 media handling defect diagnostic program 140 determines a rectifying action and displays such to the user. For example, media handling defect diagnostic program 140 may determine that the signatures of the detected media handling defect matches the signatures of a known media handling defect caused by the sixth decurler backup bearing. In such instance media handling defect diagnostic program 140 may then propose the solution known to rectify the media handling defect (e.g., replace the sixth decurler backup bearing).

In step 314, media handling defect diagnostic program 140 determines if the detected media handling defect has been fixed. This can occur in a number of ways. In some embodiments, media handling defect diagnostic program 140 receives an input via input data 130 from the user indicating if the media handling defect is still occurring or the rectifying action has solved the problem. In some embodiments, media handling defect diagnostic program 140 restarts as step 304 and receives an image of a second sheet, subsequent to the rectifying action being performed, and determines if there is a detected media handling defect.

If, in step 314, media handling defect diagnostic program 140 determines that the media handling defect has not been fixed, then the program restarts at step 306 by again comparing the detected media handling defect to the database of known media handling defects. In some embodiments, in an additional step media handling defect diagnostic program 140 updates database 120 with the failure of the rectifying action to fix the media handling defect.

If, in step 314, media handling defect diagnostic program 140 determines that the media handling defect has been fixed, then in step 316 media handling defect diagnostic program 140 updates the library in database 120. For example, if the signatures of the detected media handling defect did not match the signatures of the known media handling defect exactly, media handling defect diagnostic program 140 may add the nonmatching signatures to database 120 as being associated with that known media handling defect so as to more accurately compare future detected media handling defects with known media handling defects.

Figure 7:
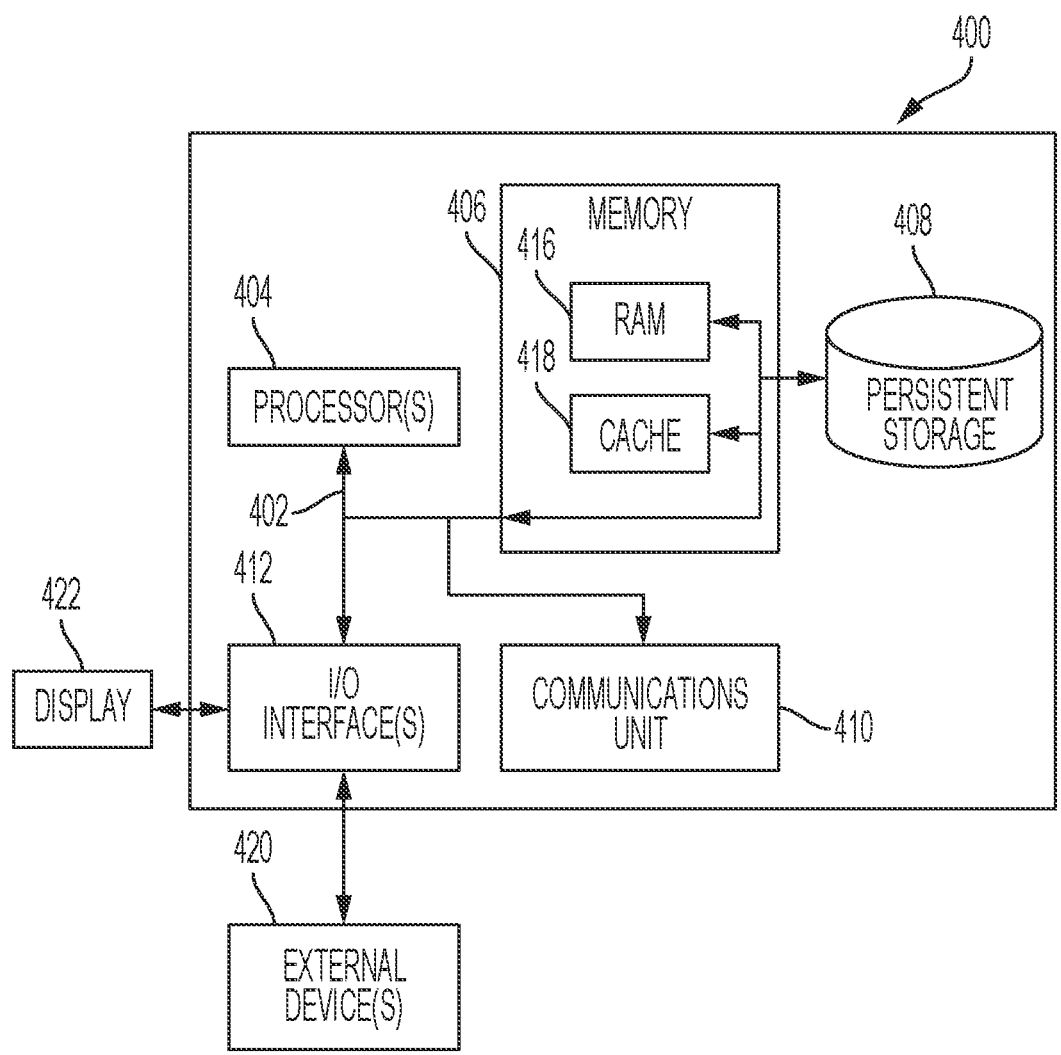

FIG. 7 is a block diagram of internal and external components of computer system 400, which is representative of the computing device of FIG. 2, in accordance with some embodiments of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Printing device
12 Print heads or markers
14 Image capturing device
16 Dryer
18 Dryer
20 Cooler
22 Duplex loop
24 Inverter
100 Automatic media handling defect diagnostic environment
110 Network
120 Database
130 Input data
140 Automatic media handling defect diagnostic program
200 Component map
202 Sheet
204 Roller
210 Feeder idler rollers
212 Paper path transport idler rollers
214 Registration transport idler rollers
216 Iron on roll
218 Marker transport belt hole pattern
220 Print heads
222 Sensors or sensor locations
224 Dryer entrance fingers
226 Dryer belts
228 Dryer bridge ramps
230 Dryer exit ribs
232 Decurler backup bearings
234 Dryer vacuum (VCT) transport (XPORT) vents
236 Duplex transport (XPORT) upper baffle vent slots
238 Duplex transport (XPORT) lower baffle vent slots
240 Stacker idler mounting screws
250 Component map
252 Sheet
254 Idler roller
256 Location
300 Flowchart
302 Step
304 Step
306 Step
308 Step
310 Step
312 Step
314 Step
316 Step
400 Computing device
402 Communications fabric
404 Processing units
406 Memory
408 Persistent storage
410 Communications unit
412 Input/output (I/O) interfaces
416 Random access memory (RAM)
418 Cache memory
420 External device(s)
422 Display
CPD Cross process direction
D1 Diameter
D2 Dimension
PD Process direction
W1 Width
W2 Width

What is claimed is:

1. A method of automatically diagnosing one or more media handling defects on a sheet subjected to one or more printer conveyance operations, the method comprising:

processing the sheet to subject the sheet to one or more printer conveyance operations;

receiving a first image of the sheet subjected to the one or more printer conveyance operations;

analyzing the first image to determine whether a media handling defect is present on the processed sheet as a result of the one or more printer conveyance operations;

where it is determined that a media handling defect is present on the processed sheet as a result of the one or more printer conveyance operations, comparing the detected media handling defect on the sheet subjected to the one or more printer conveyance operations with one or more known media handling defects associated with the one or more printer conveyance operations stored in a database;

where the comparison results in a match between the detected media handling defect on the sheet subjected to the one or more printer conveyance operations and the one or more known media handling defects associated with the one or more printer conveyance operations stored in the database; and, displaying a rectifying action, wherein, the step of determining that the detected media handling defect matches one or more known media handling defects in the database comprises comparing detected media handling defect signatures to known media handling defect signatures associated with one or more printer conveyance devices, and wherein, the step of comparing the detected media handling defect signatures to the known media handling defect signatures comprises comparing the detected media handling defect signatures to elements of one or more printer conveyance device component maps.

2. The method as recited in claim 1, further comprising:

after the step of displaying a rectifying action, receiving an indication that the rectifying action has fixed the detected media handling defect; and, updating the database.

3. The method as recited in claim 2, wherein the step of receiving the indication that the rectifying action has fixed the detected media handling defect comprises:

receiving an input from a user.

4. The method as recited in claim 2, wherein the step of receiving the indication that the rectifying action has fixed the detected media handling defect comprises:

subjecting a second sheet to the one or more printer conveyance operations;

receiving a second image of the second sheet subjected to the one or more printer conveyance operations; and, determining that the second image does not include the detected media handling defect.

5. The method as recited in claim 1, further comprising:

determining that the detected media handling defect does not match the one or more known media handling defects in the database; and, displaying an alert.

6. The method as recited in claim 1, wherein the first image is received from an inline imaging module of a printing device.

7. The method as recited in claim 1, further comprising:

determining that the detected media handling defect does not match the one or more known media handling defects in the database;

receiving an input corresponding to a solution to the detected media handling defect; and, updating the database.

8. The method as recited in claim 1, further comprising:

after the step of displaying a rectifying action, receiving an indication that the rectifying action has not fixed the detected media handling defect; and, updating the database.

9. A system for automatically diagnosing one or more media handling defects on a sheet subjected to one or more printer conveyance operations, the system comprising:

one or more computer processors;

one or more computer readable storage media;

a printing device including an image capturing device; and, program instructions stored on the one or more computer readable storage media for execution by at least one of the one or more computer processors, the program instructions comprising:

program instructions to receive a first image of a first sheet subjected to a printer conveyance operation from the image capturing device;

program instructions to analyze the first image to determine whether a media handling defect is present on the processed first sheet as a result of the one or more printer conveyance operations;

program instructions to determine that the first image includes a detected media handling defect associated with the one or more printer conveyance operations;

where it is determined that a media handling defect is present on the processed first sheet as a result of the one or more printer conveyance operations, program instructions to compare the detected media handling defect on the processed first sheet with one or more known media handling defects associated with the one or more printer conveyance operations stored in a database;

where the comparison results in a match between the detected media handling defect on the processed first sheet subjected to the one or more printer conveyance operations and the one or more known media handling defects associated with the one or more printer conveyance operations stored in the database; and, program instructions to display a rectifying action, wherein, the program instructions to determine that the detected media handling defect matches one or more known media handling defects in the database comprise program instructions to compare detected media handling defect signatures to known media handling defect signatures associated with the one or more printer conveyance devices, and, wherein, the program instructions to compare the detected media handling defect signatures to the known media handling defect signatures comprise program instructions to compare the detected media handling defect signatures to elements of one or more printer conveyance device component maps.

10. The system as recited in claim 9, wherein the program instructions further comprise:

program instructions to receiving an indication that the rectifying action has fixed the detected media handling defect; and, program instructions to update the database.

11. The system as recited in claim 10, wherein the program instructions to receive the indication that the rectifying action has fixed the detected media handling defect comprise:
 program instructions to receive an input from a user.

12. The system as recited in claim 10, wherein the program instructions to receive the indication that the rectifying action has fixed the detected media handling defect comprise:
 program instructions to subject a second sheet to the one or more printer operations;
 program instructions to receive a second image of the second sheet subjected to the one or more printer conveyance operations; and,
 program instructions to determine that the second image does not include the detected media handling defect.

13. The system as recited in claim 9, wherein the program instructions further comprise:
 program instructions to determine that the detected media handling defect does not match the one or more known media handling defects in the database; and,
 program instructions to display an alert.

14. The system as recited in claim 9, wherein the image capturing device is an inline imaging module arranged proximate a loop of the printing device.

15. The system as recited in claim 9, wherein the program instructions further comprise:
 program instructions to determine that the detected media handling defect does not match the one or more known media handling defects in the database;
 program instructions to receive an input corresponding to a solution to the detected media handling defect; and,
 program instructions to update the database.

16. The system as recited in claim 9, wherein the program instructions further comprise:
 program instructions to receive an indication that the rectifying action has not fixed the detected media handling defect; and,
 program instructions to update the database.

\* \* \* \* \*